Aug. 1, 1950 J. F. SEITZ ET AL 2,517,246
METHOD OF PRODUCING AND EXHIBITING STEREOSCOPIC
MOTION PICTURES IN COLOR
Filed Feb. 21, 1948 4 Sheets-Sheet 1

INVENTORS,
John F. Seitz
Gordon Avil
BY Hazard & Miller
ATTORNEYS

UNITED STATES PATENT OFFICE 2,517,246

METHOD OF PRODUCING AND EXHIBITING STEREOSCOPIC MOTION PICTURES IN COLOR

John F. Seitz, Los Angeles, and Gordon Avil, Van Nuys, Calif.

Application February 21, 1948, Serial No. 10,066

10 Claims. (Cl. 88—16.4)

This invention contemplates the introduction of new principles in the production and presentation of motion pictures. We propose to achieve a stereoscopic, bi-visual and complete action motion picture by persistance of vision.

In the past, red and green glasses or other optical devices have been employed as a necessity in the viewing of stereoscopic pictures to force one eye to see a right picture and the other eye to see a left picture. These devices have always proved to be unacceptable to motion picture audiences except for perhaps one viewing of such pictures as a novelty.

With our process the necessity for an audience to wear optical devices to achieve the stereoscopic effect is eliminated. Our pictures will have a lifelike, plastic, dual-vision quality that can be viewed normally and comfortably without the need of any optical device to achieve our effect.

One of the primary objects of this invention is the elimination of the non-plastic, one-lens, one-eye, mono-vision picture of the present motion picture camera, together with its registration of only half of the complete action performed before it and substitute instead a plastic, stereoscopic, dual-vision, full-action motion picture. This is accomplished by the use of two films in a dual-lens dual-movement camera with camera shutters for each movement so displaced so that when one shutter is closing for the film pull-down the other shutter is opening; this will enable us to obtain complete registration of the total action enacted before such camera.

Another object of this invention is to provide a simple high fidelity additive color system which will greatly alter and partially eliminate the present methods and apparatus for taking, processing and projecting black and white and color motion pictures.

With the stereoscopic motion picture system, we propose to incorporate the additive color system to supplement and enhance the plasticity of our dual-vision process and to produce a greater stereoscopic effect than would be achieved in black and white.

It is further proposed to make such additive color pictures easier to view and to cause less eye fatigue than in existing color systems by combining certain essentials of the physical or Young-Helmholtz color theory with the psychological or Opponent color theory.

It can no longer be doubted that color motion pictures have more appeal to the public than black and white motion pictures. However, as the majority of color motion pictures viewed in the theatres are projected from a color monopack projection film which type of film is more expensive than ordinary black and white film not all motion pictures can be conveniently or practically made in color as would be desirable.

It is an object of this invention to sharply reduce the expense of the color films by producing a black and white projection film which when projected through a projector as disclosed in the present application will produce beautiful, full color motion pictures.

Another object of this invention is to provide special filters through which the films are projected, said filters being so designed as to give full color values to each scene and further arranged to ease the fatigue on the eyes and make the viewing of color motion pictures easier.

Some additive color motion picture systems have in the past been objectionable or useless because when two or more frames were projected on the screen simultaneously they were at times out of registry with one another or with succeeding or preceding sets of frames. The present invention proposes to overcome this objection by the provision of means whereby frames that are projected simultaneously are rigidly held in registry and frames that are projected consecutively are rigidly held in registry with one another electronically.

The present invention also provides a projection apparatus wherein the projection lenses are separated both vertically and horizontally so that the difficulties and limitations of closely juxtaposed lenses are eliminated.

With the foregoing and other objects in view, which will be made manifest in the following detailed description and specifically pointed out in the appended claims, reference is had to the accompanying drawings for an illustrative embodiment of the invention, wherein:

The basic stereoscopic system of the present invention consists in photographing the action of a scene through a dual-lens dual-shutter camera, the camera shutters being synchronized to function alternately so that when one shutter closes one lens, the other shutter opens the other lens so that approximately 100% of the action of a scene is photographed. Positive frames are made from the negative frames taken and projected on a screen, alternate frames representing the scenes taken by one lens of the camera, and adjacent frames representing scenes taken by the other lens of the camera, alternate frames of course being the stereoscopic mates of the adjacent frames but 180° out of phase, the projection of one frame and its stereoscopic mate taking place in a period of time such that the projected pictures can be combined by persistence of vision.

The present invention might well be termed a combined multiple-successive projection system since multiple pictures are projected on a screen simultaneously and in registry through different colored filters and combined by persistence of vision with succeeding multiple pictures, stereoscopic mates of the first multiple pictures, which are projected on the screen simultaneously and in registry through still different colored filters to obtain stereoscopic motion pictures in color. The basic stereoscopic-color system will be now explained although the preferred form of the invention is a somewhat modified form of the basic system. The basic system is as follows. The action of a scene is photographed on separate color monopack films by a dual-lens dual-shutter camera, the camera shutters being synchronized to function alternately so that when one shutter closes the other shutter opens. For purposes of description, frames taken by the left hand lens will be referred to as left hand frames and frames taken by the right hand lens will be referred to as right hand frames, the left and right hand frames being stereoscopic mates of one another 180° out of phase. It is proposed to take the scene appearing in each left hand frame and combine it by persistence of vision with the scene appearing in the succeeding right hand frame to give a stereoscopic effect. So, for purposes of illustration it is only necessary to explain the system of the present invention for one left hand frame and its succeeding right hand frame. Since there are three primary colors, red, blue and green, and two frames to be combined by persistence of vision, the primary colors are broken down into four colors, blue, green, yellow and magenta—yellow and magenta combining to give red, and to prepare two negative left hand frames for each original left hand frame and two right hand frames for each original right hand frame so that there are four colors and four frames. Now to go back to the original monopack left and right hand frames. They are developed and reversed and run through a printer converter which is equipped with filters embodying the four colors wherein two negative panchromatic frames are made containing the scene appearing in the original left hand color monopack frame, one panchromatic negative frame being a record measured in terms of silver densities of the blue appearing in the scene photographed and the other frame being a record measured in terms of silver densities of yellow appearing in the scene photographed; yellow being the complementary color of blue; and two negative right hand panchromatic frames are made containing the scene in the original right hand color monopack frame, one panchromatic negative frame being a record measured in terms of silver densities of the green appearing in the scene photographed and the other panchromatic negative frame being a record measured in terms of silver densities of magenta appearing in the scene photographed, magenta being the complementary color of green. Now we have a pair of left hand negatives containing the same scene but measured in terms of silver densities in different colors and a pair of right hand negative frames containing the same scene—a scene taken just after the scene appearing in the left hand frames—the right hand negative frames being a record measured in terms of silver densities of still different colors and being stereoscopic mates of one another. It is not important which pair of frames, left or right, are matched to which pair of colors, that is, blue, yellow or magenta green, but once the selection is made it must be, of course, maintained for all other left and right hand frames. Positive panchromatic left hand frames and right hand frames are then prepared using the negative right and left hand panchromatic frames and these positive frames are then projected in a dual-lens projector, the left hand frames being projected on a screen through yellow and blue filters simultaneously and in registry followed by the right hand positive frames through magenta and green filters simultaneously and in registry, all four frames being projected during a period of time normally necessary for the projection of one frame in an ordinary projector, persistence of vision combining the synthesized yellow and blue picture with the synthesized magenta and green picture to give perfect stereoscopic motion pictures in color.

The color system of the present invention will now be described. One of the earliest motion picture color processes was the additive Kinemacolor process utilizing persistence of vision for addition of two colors. In the Kinemacolor process by means of a rotating disc of colored filters placed in front of the camera, pictures were taken on panchromatic film alternating through a red and green filter at twice the normal speed so that the two negatives were made one for each filter. The positives from the negatives were projected by a machine similarly equipped with a rotating shutter which was made to operate synchronously with the picture so each picture taken through the red filter was again projected through a red filter and the picture taken through the green filter similarly projected through a green filter. The succession of red and green pictures upon the screen produced synthesis by persistence of vision and gave the effect of a two color additive picture. The Kinemacolor process is now obsolete. One of its great disadvantages was that the flicker produced by alternation of red and green light upon the screen was distressing to the eye, the eye becoming fatigued by the continuous synthesizing with warm color red with cool color green. In the present invention a pair of different color pictures are projected on the screen in registry simultaneously to produce a two color synthesized picture which is immediately followed by a second pair of pictures in two colors to produce a second synthesized color picture and the eye is only required to combine by persistence of vision the first synthesized pair of pictures with the second synthesized pair of pictures and it is obvious that since the eye is only required to blend two synthesized pictures instead of two single colored warm or cool pictures, the blended color pictures being less harsh on the eye, that fatigue on the eye is much less in the system disclosed in the present invention. In the Kinemacolor system the eye first observed a warm colored picture and then observed a cool colored picture and was required to blend the two by persistence of vision while in the present invention a warm picture and a cool picture are projected simultaneously on the screen the colors of the pictures being complementary therefore synthesizing into white light, and immediately following these are a second pair of warm and cool pictures of different colors from the first pair but still of complementary colors; and the eye need only combine the two synthesized warm-cool pictures which results in much less fatigue to the eye. So, it will be seen that instead of the eye having to blend a warm picture with a cool picture that in the present invention it has only to blend a warm-cool picture with a warm-cool picture.

There are also other means provided in the present invention for easing eye strain and fatigue and for the moment need only be referred to as the "easing off color system." The cut out means in the projector of the present invention is also designed to ease eye fatigue.

Another objection to the Kinemacolor process was that rapidly moving objects showed a band of color images. The main cause of color bands was that while photographing the scene the scene changed during cut out so that a succeeding picture was in an appreciably different position when photographed through the red filter than when photographed through the green filter and the eye could not blend the two images. In the present invention color bands are eliminated by the instantaneous recording of the color spectrum or elements of a scene upon the color monopack film instead of recording different colors at different times.

The basic four frame system of the present invention is modified somewhat in the preferred form of the invention in order to further ease eye strain and fatigue by an "easing off color system." The "easing off color system" adds two more colors which are secondary colors to the four basic colors in such a manner as not to change but complement the basic system. What has been done is that each of the four basic colors is embodied in a filter the segments allotted to the basic colors being approximately the same size, the blue and green color segments in the filter each being flanked on their sides by secondary blue-green segments which segments are much smaller than the basic segments; and the yellow and magenta segments of the filter are flanked on either side by secondary red filter segments which are also much smaller than the basic segments. The secondary colors red and blue-green are complementary to one another so as to synthesize into white light.

The negative panchromatic frames which are made from the original color monopack film may be modified in one form of the invention from that given in the previous description in that of the two left hand frames one will be measured in silver densities according to the basic yellow color and the secondary red color and the other of the left hand frames will be measured in silver densities according to the blue basic color and secondary blue-green and that of the right hand frames one will be measured in silver densities according to the basic magenta color and the secondary red color and the other of the right hand frames will be measured in silver densities according to the basic green color and secondary blue-green color. Positives are made retaining the characteristics of the negatives but, of course, in reversed relationship and the left hand frames are then projected, one through a revolving filter composed of a basic yellow segment flanked by a secondary smaller red filter segment and the other left hand frame projected through a revolving filter composed of a blue filter segment flanked by smaller secondary blue-green filter segments; and the right hand frames are projected one through a revolving filter composed of a basic magenta color segment flanked by smaller secondary red filter segments and the other right hand frame projected through a revolving filter composed of a basic green filter segment flanked by smaller secondary red filter segments. The "easing off color system" is designed to ease the eye from yellow through red to magenta instead of from yellow directly to magenta and from blue through blue-green to green instead of from blue directly to green. So, it will be seen that the system actually makes it easier for the eye to adjust itself from one warm color to another warm color by providing an "easing" warm color which is a color intermediate of the two warm colors so that there is a more gradual change in colors impinging on the retina instead of sharp changes. Likewise, the eye is eased from one cool color to another cool color by providing an easing cool color which is intermediate the two cool colors so that there is a gradual change of colors. It will be appreciated that the colors are always so selected as to synthesize into white light thereby insuring perfect color fidelity. Whether the printer converter is used to make color record of four colors or six colors, it is preferred to project the positives through the six color filters in order to get the easing off effect.

Figures 1, 2, 3, 10:
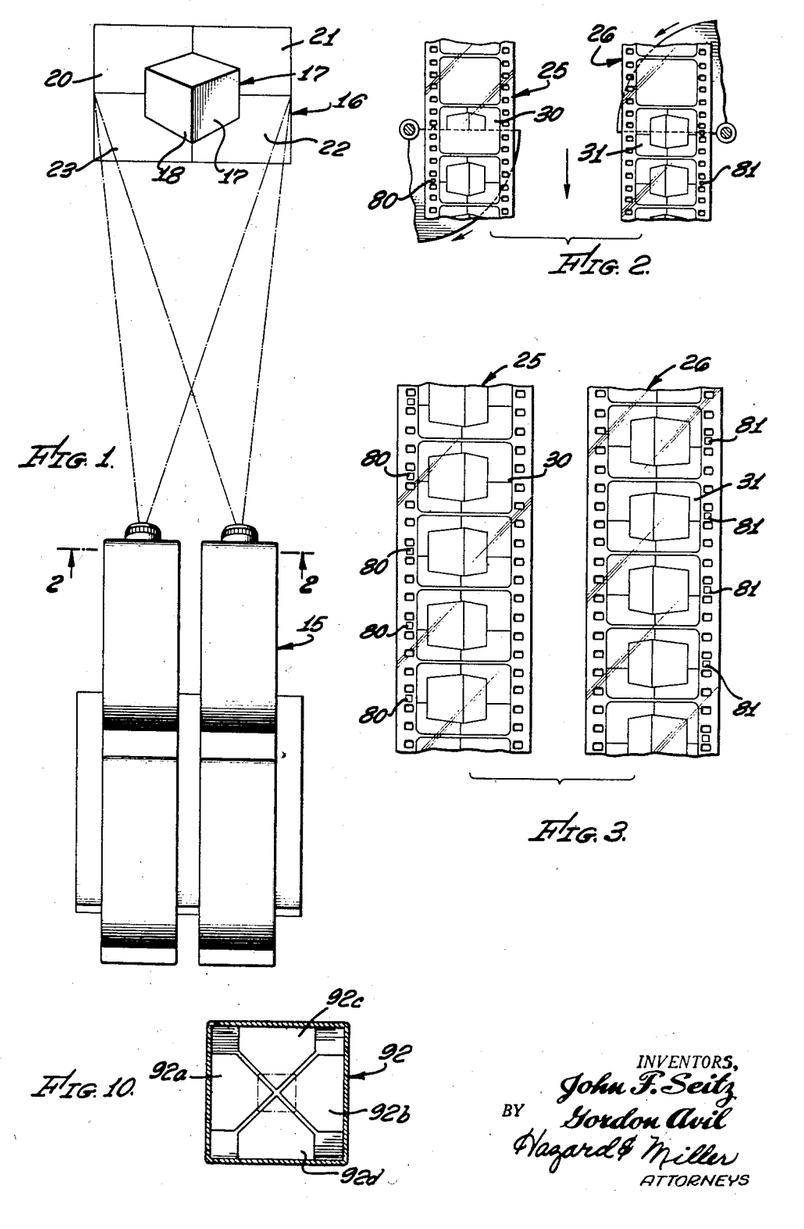
Fig. 1 discloses a view looking down on the top of a dual-lens camera and slightly back of the camera showing a scene in front of the camera.
Fig. 2 discloses a view along lines 2—2 of Fig. 1 showing the alternating shutter moving across the color monopack film.
Fig. 3 discloses two color monopack films which have been exposed through the dual-lens camera.
Fig. 10 shows a photoelectric cell unit which is part of the registry system.

Referring to the accompanying drawings wherein similar reference characters designate similar parts throughout, Fig. 1 discloses a view looking down on the top of a camera generally entitled 15 and slightly back of the camera. A scene generally entitled 16 is in front of the camera 15 and this scene is taken for illustrative purposes only and comprises a cube 17 of which only two sides, the left 18 being blue-green and the right 19 being red, can be viewed by the camera. The top of the cube is white but can not be viewed by the camera. There is a background for the cube 17 composed of colored rectangles with the upper left hand rectangle 20 being blue, the upper right hand rectangle 21 being yellow, the lower right hand rectangle 22 being magenta and the lower left hand rectangle being green. Camera 15 has two lenses in spaced side by side relationship positioned with respect to scene 16 so as to give a stereoscopic dual vision or three dimensional effect. There are two separate color monopack films, for instance, of the five layer type generally entitled 25 and 26 which are used in the camera and these color films form the color nucleus of the system and so it is important that all precautions be taken to insure that the colors of the scene are properly recorded on the color film. The shutters of the camera 15 are arranged to open and close alternately so that approximately 100% of the action is photographed, half on film 25 and the other half on film 26, as compared with the usual 46 or 47% as is common present in motion picture practice. It will thus be seen that the right hand lens supplies action of the scene which is normally left out of ordinary motion picture practice. Alternate frames on films 25 and 26 can be considered as 180° out of phase. Taking pictures as above set out is not comparable to merely speeding up an ordinary camera so as to take 48 frames per second as that only results in more pictures and not more of the scene. In film 25, frame 30 will be used for purpose of illustration and in film 26, frame 31 will be used for purposes of illustration; an explanation of these two frames will be sufficient for all other frames, frames 30 and 31 being stereoscopic mates of one another 180° out of phase. In Fig. 2, the operation of the alternating shutters is depicted and when the right hand shutter is covering frame 31 the left hand shutter is uncovering frame 30. As frame 30 is uncovered, frame 31 is covered. Therefore, when frame 30 is completely uncovered, frame 31 will be completely covered. Color monopack films 25 and 26 are then developed, reversed and run through a printer converter equipped with special filters to select certain colors where two negative panchromatic frames are made for each original color frame taken, the negative frames being records of the selected colors measured in terms of silver densities. From the negatives positives are made so that with reference to the final positive panchromatic film shown in Fig. 4 and generally entitled 32, frame 30 is made into frames 33 and 34 and frame 31 is made into frames 35 and 36 so that the basic system is sets of four frames. An explanation of the colored filters used in the printer converter will be made in order to understand the steps by which the scenes appearing in the color monopack film are transferred as colored records to black and white panchromatic film. The color filters used in the printer converter may be similar to filters 41 and 42, shown in Fig. 7 or may be basic four color filters. If a six color system is used, it will be seen that filters 41 and 42 contain the four basic colors blue, yellow, green and magenta, blue and green being primary colors and yellow and magenta being colors when when combined will give the color red which is the other primary color. Filters 41 and 42 also have color segments of the secondary colors red and blue-green. The above described color system is the preferred selection although there are other combinations of the four basic colors which could be used. For instance, if the primary colors red, green and blue are broken down into red, green, blue-green and magenta, blue being broken down into blue-green and magenta, another four color basic color system is achieved and the secondary colors in this case would be reddish magenta and greenish blue-green. If the primary colors are broken down into red, blue, yellow and blue-green, green being broken down in this case into yellow and blue-green still another basic four color system is attained and the secondary colors in this case would be orange and bluish blue-green. In the basic four color system where blue is broken down red and blue-green are complementary and green and magenta are complementary and the secondaries reddish magenta and greenish blue-green are complementary; and in the basic four color system where the primary color green is broken down red and blue-green are complementary colors, yellow and blue are complementary colors and the secondary colors orange and blue-green are complementary colors. Filter 41 has a large blue segment 45, a large green segment 47, each large segment being flanked by smaller blue-green segments 46, and filter 41 also has a yellow translucent cut out 48 and a magenta translucent cut out 49. Flter 42 has a large yellow segment 50, a large magenta segment 52, each large segment being flanked on either side by smaller red segments 51 and filter 42 has a translucent green cut out 53 and a translucent blue cut out 54. The purposes of the translucent cut outs will be explained hereinafter but it should be understood that the green and blue translucent cut outs can be used in filter 41 and the magenta and yellow translucent cut outs used in the filter 42 without departing from the scope of the invention.

The preferred ratio of the basic color segments to the secondary color segments is approximately four to one though this invention is not limited to this ratio. For purposes of description it will be considered that filters 41 and 42 are used in the printer converter although in such case the translucent cut outs would have no function. In the printer converter, if a six color system is used, negative panchromatic films are exposed to the projected color monopack films 25 and 26 through revolving filter segments to filters 41 and 42 so that for frame 30 of the original color monopack film there will be two panchromatic film negatives, one being exposed through revolving blue segments 45 flanked by blue-green segments 46 the other frame being exposed through revolving green segments 47 flanked by blue-green segments 46 so that the negatives are records of their respective color filters in terms of silver densities.

Two panchromatic negatives are also made for color monopack frame 31, one negative being exposed to the projected monopack frame through revolving yellow segment 50 flanked by two red segments 51, the other negative being exposed to the projected color monopack frame through revolving magenta segment 52 which is flanked on either side by red segments 51; therefore, these segments are records of their respective color filter segments in terms of silver densities. Although the above description has been described for revolving filters, the main point is for the light issuing from the color monopack frame in each of the above cases being allowed to pass through the yellow, blue, green and magenta filters for a longer period of time than the red and blue-green filters so that the negative frames taken individually represent the four basic colors and incidentally represent the secondary colors, but it is to be noted that in the preferred form of the invention the color segments on the filters are so dimensioned that for four frames taken collectively the light is allowed to pass through the red, green, yellow, magenta, red and blue-green filter the same length of time, and collectively any four frames represent the six colors equally.

Figures 4, 5:
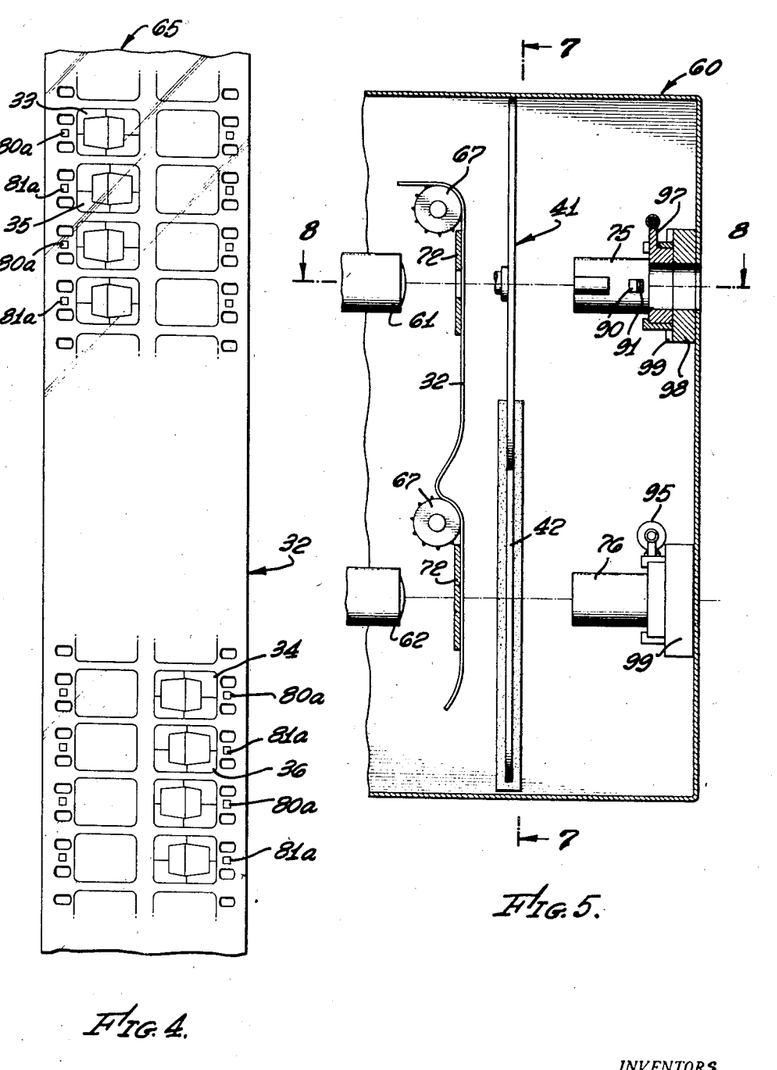
Fig. 4 discloses the black and white projection film as is produced by the present invention.
Fig. 5 is a side elevation view through the projection apparatus of the present invention with sections thereof cut away.
Figure 7:
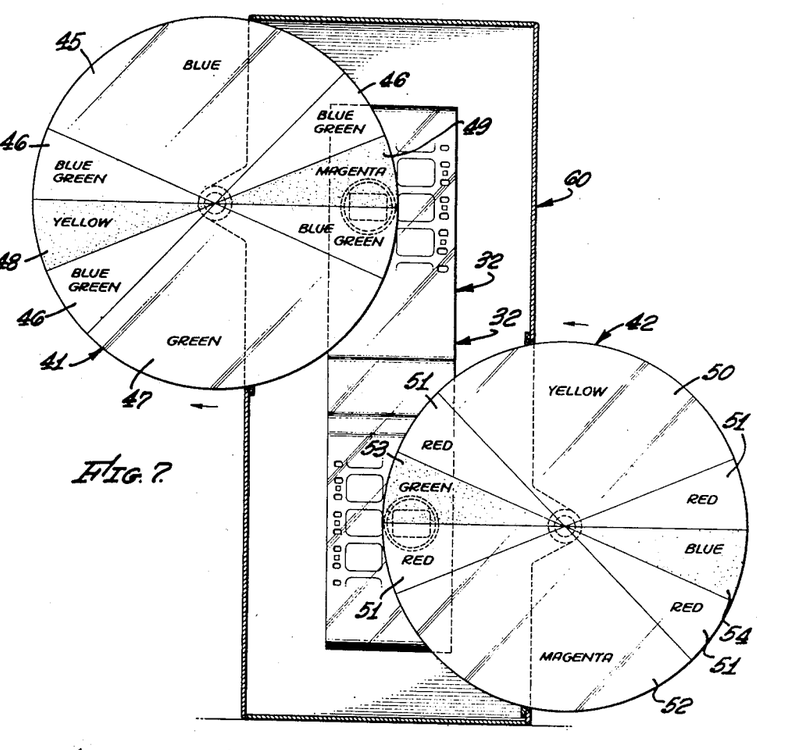
Fig. 7 is a sectional view along line 7—7 of Fig. 5.
Figure 8:
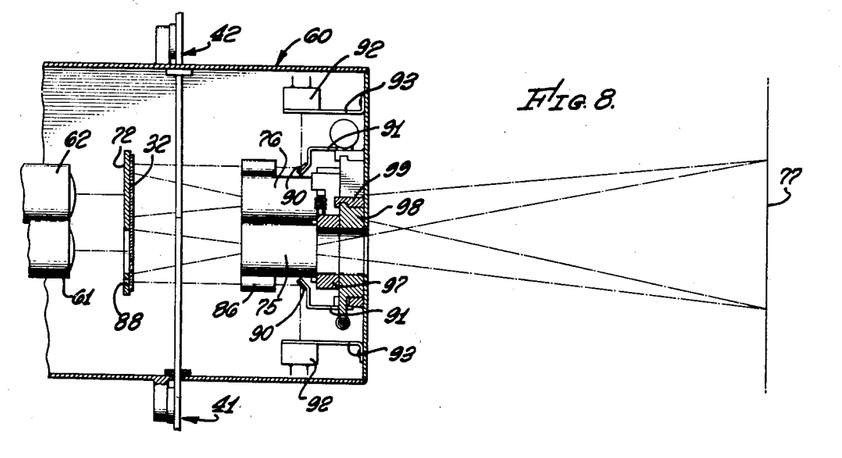
Fig. 8 is a sectional view along line 8—8 of Fig. 5.

Four positive frames are made from the above four negative frames, positive frames 33 and 34 for original color monopack frame 30 and positive frames 35 and 36 for original color monopack frame 31, all positive frames being specially positioned on positive panchromatic film 32 for projection reasons to be explained, frames 33 and 34 being the stereoscopic mates of 35 and 36, 180° out of phase. Fig. 5 shows a side elevation view of the projector generally entitled 60 of the present invention. Projector 60 has two projector lens units composed of several more parts including light sources 60' and collector lenses 61 and 62. Collector lenses 61 and 62 are vertically spaced from one another as seen in Fig. 5 and horizontally spaced from one another as shown in Fig. 7 and 8 so that collector lens 61 is positioned in line with the left hand row of frames 65 of the positive panchromatic film 32 and collector lens 62 is positioned in line with the right hand row of frames of positive film 32. In order that the four frame system will function correctly, frames 33 and 34 are so positioned on positive film 32 that when film 32 is placed over intermittently movable sprocket wheels 67 frame 33 is positioned correctly in front of collector lens 61, and simultaneously frame 34 is positioned correctly in front of collector lens 62.

Figure 6:
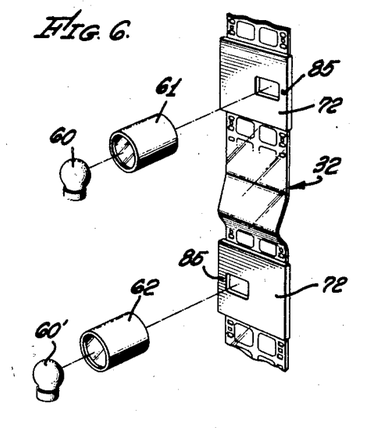
Fig. 6 is a perspective view showing the panchromatic black and white film passing through part of the projection system.

The sprocket wheels 67 are operated so that the frames 33 and 34 and 35 and 36 are projected in a period of time to enable the eye to combine them by persistence of vision. Shielding plates 72 are provided as shown in Figs. 5 and 6 and each has a large rectangular image aperture therein and the sprocket wheels are so constructed and operated that pairs of frames in film 32 are successively brought before the rectangular image apertures so as to be projected therefrom. Lens focusing mechanism 75 and 76 are movably mounted on the projector and serve to correctly focus the frames appearing in the image apertures in plates 72 on a silver screen 77, see Fig. 8, wherein the dot dash lines show the light pattern.

Filters 41 and 42 are rotatably mounted in projector 60, as shown in Figs. 5 and 7, and are driven by means not shown in synchronous fashion with the sprocket wheels 67 so that when a set of frames is being projected a basic color filter segment flanked by two minor color segments is passed before the image apertures in plates 72 and the apparatus is initially set up so that the proper filter segments are passed before the plates 72 when the proper frames are positioned therein. For instance, if the frame which resulted from the negative frame having a basic yellow and secondary red silver density thereon is in the rectangular image aperture in the top plate 72, the large yellow filter segment of filter 41 flanked by small filter segment is passed before the rectangular image aperture in the top plate 72.

In motion picture practice, it is customary to have an opaque cut out during the pull up period but this practice results in some eye fatigue and strain since there is a dark period on the screen intermittent each light period and it is desirable to eliminate this eye fatigue and strain in the present invention by providing translucent cut out sections in the filter, yellow section 48, magenta section 49, green section 53 and blue section 54. The light beams issuing from the collector lenses 61 and 62 and passing through film 32 are allowed to pass through yellow and blue transparent segments simultaneously during alternate pull ups, the yellow and blue colors being complementary and combining on the screen to give the appearance of gray color. It will not be a white screen because the cut out segments are not transparent but translucent. If they were transparent such construction would reveal the pull up on the screen which is undesirable but the cut outs have a translucent density such that the pull up does not show and yet there is enough light passing through to combine on the screen to give the appearance of gray.

At intervening cut out periods, the magenta green translucent sections are positioned before the collector lenses 61 and 62 so that beams of light shine through these translucent sections simultaneously during the pull up period and since the magenta and green are also complementary colors the screen appears gray.

Figure 9:
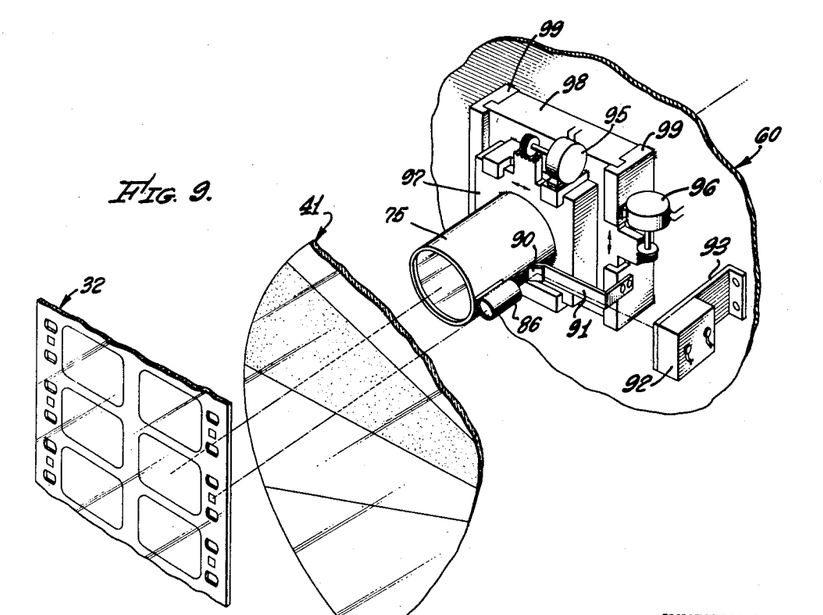
Fig. 9 is a perspective view of the projection system showing means for keeping the films in registry.
Figure 11:
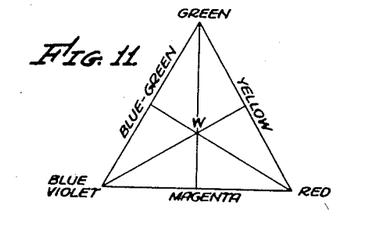
Fig. 11 shows a color diagram.

Means are provided for insuring registry of the projected pictures. Registry spots for this purpose are photographed on the film either at the time when the original scene is photographed or in the printer converter. If the spots are photographed on the film at the time of photographing the original scene an aperture is provided in camera 15 along side each of the image apertures which apertures are so positioned with relation to the color monopack film 25 and 26 which is positioned inside the camera that when the shutters for the lenses of the camera are opened, a spot 80 is photographed in the margin of film 25 next to each scene photographed and a spot 81 is photographed in the margin of film 26 next each scene photographed. Since the apertures in the camera are in a fixed relation to the image apertures, the spots 80 and 81 will be in a fixed relationship to the photographed scene; that is, always the same distance from the photographed scene of each frame. These spots are carried along during processing and through the printer convertor up to and including the positive final film 32 where the spots 80 are represented by the numeral 80a and spots 81 by the numeral 81a. Shield plates 72 have spot apertures 85 therein which are larger than the spots in the film so that when a frame is within the image apertures of shield 72 light from the light source 60' will pass through the image aperture and also through the spot aperture. The light passing through the spot apertures in shield 72 will pass through the spot in shield 72 and will be collected by small collector lens 86 and focused on angularly set mirrors 90 which are mounted by means of brackets 91, said mirrors reflecting the spot light into a photocell unit 92 which is mounted on the projector by means of a bracket 93. The photocell unit 92 may be of any suitable construction and Fig. 10 shows a construction which can be used and in this case 92a, 92b, 92c and 92d represent photocells which are electrically connected to a vacuum tube amplifier. The vacuum tube amplifier which is provided with the usual power supply amplifies signals and sends currrent to motors 95 and 96, see Fig. 9. The focusing lenses for the projector are mounted on blocks 97 which blocks are slidably mounted within grooves provided in blocks 98 which are likewise vertically slidable within grooves provided in plates 99 which are fixedly fastened on the projector. Motor 95 which is for the purpose of moving the focusing lenses horizontally is mounted on block 98 and motor 96 which is for the purpose of moving the focusing lenses vertically is fixedly mounted on plates 99. The vacuum tube amplifier is so connected to the photo tubes 92a, 92b, 92c and 92d and to the motors 95 and 96 that whenever the registry spot shown in dot dash lines in Fig. 10 and labeled 100 impinges on photo tube 92a more than on 92b the amplifier amplifies the difference in current issuing from the photo tube and sends a signal to motor 95 so as to move the focusing lenses in such a manner as to again balance the system and should the registry spot move vertically so as to shine more light on photo tube 92c than on 92d the resulting difference in current will be amplified by the amplifier and sent to motor 96 which will vertically move the focusing lenses so as to once again center the registry spot. It will be seen that when the film weaves or that when a film is supplied that has a weave in it, that is, when the scenes photographed are different distances away from the sprocket holes that the light spot will move in such a direction as to energize one of the motors to correct the positioning of the focusing lenses so that frames which are projected simultaneously are always in registry with one another or with succeeding or preceding frames. Therefore, this simple system overcomes the disadvantages of prior additive motion picture color systems which were objectionable in that the pictures were not in registry with one another.

The basic concepts of the present invention may be applied to the television art as well as to the motion picture art to give a stereoscopic effect and also to give colored televised pictures. In order to have color television, additive color synthesis must be used and the additive color concepts of the present invention may be incorporated into a color television system to provide a simple and inexpensive system.

Although the specification has described the projection film, for instance, in Fig. 4, as containing a double row of frames and in which the sound track is in the middle of the film, this representation is not intended to limit the scope of the invention since pairs of frames may be projected simultaneously and consecutively from a film containing only a single row of frames and in which the sound track is in the usual place between the image in the frame and the sprocket holes as is common in ordinary film. This system would entail enlargement and anamorphosis of the picture to achieve desired size and proportion on existing 35 millimeter film, the important point being to obtain consecutive projections of multiple pictures whatever type film is used.

Various changes may be made in the details of construction without departing from the spirit and scope of the invention as defined by the appended claims.

We claim:

1. A process of producing stereoscopic motion pictures in color which comprises preparing sets of four frames of black and white film where each frame is a record measured in terms of silver densities according to a preselected color of the colors of a scene, the frames of a set being records of four different colors, the colors being two of the primary colors and two other colors which when combined produce the other primary color, two of the frames of each set being stereoscopic mates of the other two frames of that set, projecting the frames in pairs through color filters embodying the four colors which the frames are records of, adjacent pairs being stereoscopic mates of one another providing cut out periods between projection of pairs of frames, and inserting colored translucent cut out sections in place of the filters during the cut out periods.

2. The process of producing stereoscopic dual-vision motion pictures in color which comprises photographing a scene through a dual-lens-dual-shutter camera on color monopack film developing and reversing the color monopack film, preparing two positive panchromatic frames for each original frame taken, the positives prepared from the frames taken from one lens of the camera being color records respectively of the blue and yellow appearing in the scene photographed, the positives prepared from the frame taken from the other lens of the camera being color records respectively of the magenta and green appearing in the original scene, and projecting the blue and yellow color record frames simultaneously and in registry through blue and yellow filters and projecting in succession the magenta and green color record frames simultaneously and in registry through magenta and green filters, the four frames being projected in a period of time such that the eye may combine the four pictures by persistence of vision.

3. The process of producing color motion pictures which comprises photographing a scene on color monopack film, developing and reversing the color monopack film, projecting a frame of the color monopack film through a blue filter and then through a blue-green filter onto a negative panchromatic film to produce a negative frame, projecting the same frame of color monopack film through a yellow filter and then through a red filter onto a negative panchromatic film to produce a second negative frame, projecting another frame of the color monopack film through a green filter and then through a blue-green filter onto a negative panchromatic film to produce a third negative frame, and also through a magenta filter and then a red filter to produce a fourth negative frame, the light issuing from the color monopack film in each of the above cases being allowed to pass through the yellow, blue, green and magenta filters for a longer period of time than through the red and blue-green filters, preparing positives from the four negatives, projecting the first and second positives through the same color filters used to produce the first and second negatives, simultaneously and in registry, then projecting the third and fourth positive frames through the same color filters used to produce the third and fourth negative frames, simultaneously and in registry, the projection of the four frames taking place in a period of time of such length as to enable the eye to blend the pairs of frames by persistence of vision.

4. The process of producing stereoscopic dual vision motion pictures in color which comprises photographing a scene through spaced lenses on color film, preparing two positive black and white frames from each original frame taken, with the positives prepared from the frames of one lens being color records respectively of the blue and yellow appearing in the scene photographed and the positives prepared from the frames taken from the other lens being color records respectively of the magenta and green appearing in the original scene, and projecting the blue and yellow color record frames simultaneously and in registry through blue and yellow filters and projecting in succession the magenta and green color record frames simultaneously and in registry through magenta and green filters, the four frames being projected in a period of time such that the eye may combine the four pictures by persistence of vision, the blue and green filters having marginal portions of blue-green and the yellow and magenta filters having marginal portions of red whereby easing off of the colors is provided.

5. The process of producing stereoscopic dual vision motion pictures in color which comprises photographing a scene through spaced lenses on color film, preparing two positive black and white frames from each original frame taken with the positives prepared from the frames of one lens being color records respectively of a primary color and its complementary color appearing in the scene photographed and the positives prepared from the frames taken from the other lens being co'or records respectively of another primary color and its complementary color appearing in the scene photographed, the four colors being such as to synthesize into white light, and projecting the positive frames through color filters matching their color records in a period of time such that the eye may combine the four pictures by persistence of vision.

6. The method of producing stereoscopic dual vision motion pictures in color which comprises photographing a scene through spaced lenses on color film so that frames taken through one lens are approximately 180 degrees out of phase with frames taken through the other lens, preparing two positive black and white frames from each original frame taken with the positives prepared from the frames of one lens being color records respectively of the blue and yellow appearing in the scene photographed and the positives prepared from the frames taken from the other lens being color records respectively of the magenta and green appearing in the scene photographed, and projecting the blue and yellow color record frames simultaneously and in registry through blue and yellow filters and projecting in succession the magenta and green color record frames simultaneously and in registry through magenta and green filters, the four frames being projected in a period of time such that the eye may combine the four pictures by persistence of vision.

7. The method of producing stereoscopic dual vision motion pictures in color which comprises photographing a scene through spaced lenses on color film, preparing two positive black and white frames from each original frame taken with the positives prepared from the frames taken through one lens being color records respectively of two different colors appearing in the scene photographed and the positives prepared from the frames taken through the other lens being color records respectively of two other different colors appearing in the scene photographed, and projecting a pair of positives made from a frame taken through one lens and then a pair of positives made from a frame taken through the other lens, the positives being projected through color filters matching respectively the colors represented by the frames and in a period of time such as to be combined by persistence of vision.

8. The method of producing stereoscopic dual vision motion pictures in color which comprises photographing a scene through spaced lenses on color film, preparing two positive black and white frames from each original frame taken, with the positives prepared from the frames taken through one lens being color records respectively of two different colors appearing in the scene photographed and positives prepared from the frames taken through the other lens being color records respectively of two other different colors appearing in the scene photographed, projecting through spaced lenses simultaneously a pair of positive black and white frames made from a frame taken through said one lens and then projecting through spaced lenses simultaneously a pair of positive black and white frames made from a frame taken through said other lens, the positive black and white frames being projected through color filters matching respectively the colors represented by the frames, providing cut out periods between projection of pairs of frames, inserting colored translucent cut out sections in place of the filters during cut out periods, the translucent cut outs being of different colors, and viewing all the pictures projected.

9. The method of producing stereoscopic dual vision motion pictures in color which comprises photographing a scene through spaced lenses on a color film and operating the shutters on the lenses alternately so that the frames taken through one lens are approximately 180 degrees out of phase with the frames taken through the other lens and so that all of the action of the scene is exposed to the color film, preparing two positive black and white frames from each original frame taken with the positives prepared from the frames taken through one lens being color records respectively of two different colors appearing in the scene photographed and the positives prepared from the frames taken through the other lens being color records respectively of two other different colors appearing in the scene photographed, and projecting positive frames in pairs successively with a pair of positives made from a frame taken through one lens being followed by a pair of positives made from the frame subsequently taken through the other lens, the positive frames being projected through co or filters matching respectively the colors represented by the frames.

10. The method of producing stereoscopic dual vision motion pictures in color which comprises photographing a scene through spaced lenses on a color film and operating the shutters on the lenses alternately so that the frames taken through one lens are approximately 180 degrees out of phase with the frames taken through the other lens and so that all of the action of the scene is exposed to the color film, preparing two positive black and white frames from each original frame taken with the positives prepared from the frames taken through one lens being color records respectively of two different colors appearing in the scene photographed and the positives prepared from the frames taken through the other lens being color records respectively of two other different colors appearing in the scene photographed, projecting positive frames in pairs successively with a pair of positives made from a frame taken through one lens being followed by a pair of positives made from the frame subsequently taken through the other lens, the positive frames being projected through color filters matching respectively the colors represented by the frames, providing cut out periods between successive pairs of frames, and inserting colored translucent cut out sections in place of the filters during cut out periods, the translucent cut outs being of different colors.

JOHN F. SEITZ.
GORDON AVIL.

(References on following page)

REFERENCES CITED

The following references are of record in the file of this patent:

UNITED STATES PATENTS

| Number | Name | Date |
|---|---|---|
| 816,832 | Haines | July 30, 1907 |
| 1,127,382 | Featherstone | Feb. 2, 1915 |
| 1,154,607 | Brasseur | Sept. 28, 1915 |
| 1,247,646 | Craig | Nov. 27, 1917 |
| 1,258,226 | Kamowski | Mar. 5, 1918 |
| 1,300,887 | Shaw | Apr. 15, 1919 |
| 1,348,566 | Jenkins | Aug. 3, 1920 |
| 1,451,325 | Comstock et al. | Apr. 10, 1923 |
| 1,579,024 | O'Grady | Mar. 30, 1926 |
| 1,794,727 | O'Grady | Mar. 3, 1931 |
| 1,814,672 | Dupont | July 14, 1931 |
| 1,861,496 | Guggenheim | June 7, 1932 |
| 2,011,932 | Ives | Aug. 20, 1935 |
| 2,029,703 | Luboshez | Feb. 4, 1936 |
| 2,053,689 | Barnes | Sept. 8, 1936 |
| 2,064,145 | Bonneau | Dec. 15, 1936 |
| 2,200,467 | Christiani | May 14, 1940 |
| 2,211,185 | Wahl | Aug. 13, 1940 |
| 2,279,281 | Schensted | Apr. 7, 1942 |
| 2,283,466 | Schensted | May 19, 1942 |
| 2,337,736 | Cawein | Dec. 28, 1943 |

FOREIGN PATENTS

| Number | Country | Date |
|---|---|---|
| 272,288 | Great Britain | June 9, 1927 |
| 796,677 | France | Jan. 27, 1936 |